United States Patent [19]
Youngblood

[11] 4,174,115
[45] Nov. 13, 1979

[54] MOTORIZED BI-FOLD STEPWELL COVER

[76] Inventor: John W. Youngblood, 3201 Franklin, Waco, Tex. 76710

[21] Appl. No.: 864,461

[22] Filed: Dec. 27, 1977

[51] Int. Cl.² ............................................. B60R 3/00
[52] U.S. Cl. ................................. 280/163; 105/450; 280/166
[58] Field of Search ...................... 280/166, 163, 164; 105/450, 443, 444, 447, 446, 448, 445; 296/146

[56] References Cited
U.S. PATENT DOCUMENTS

| | | | |
|---|---|---|---|
| 1,868,599 | 7/1932 | Griffin | 160/188 |
| 2,024,338 | 12/1935 | Christiansen | 105/450 |
| 3,330,329 | 7/1967 | Ligh | 160/188 |
| 3,408,959 | 11/1968 | Cripe | 280/166 |
| 3,572,754 | 3/1971 | Fowler | 280/166 |
| 3,913,497 | 10/1975 | Maroshick | 280/166 |
| 3,955,827 | 5/1976 | Wonigar | 280/166 |
| 4,074,786 | 2/1978 | Joubert | 280/164 |

Primary Examiner—Robert R. Song
Attorney, Agent, or Firm—Gerald G. Crutsinger; Larry B. Dwight

[57] ABSTRACT

A stepwell cover comprising a deck consisting of first and second deck segments having edges pivotally secured together adjacent a central portion of the deck, and an actuating mechanism arranged to move a first deck segment through an angle of ninety degrees while simultaneously moving the second deck segment through an angle of one hundred eighty degrees relative to the first deck segment for moving the stepwell cover between a first position covering the stepwell and a second position providing access to the stepwell. The first deck segment is pivotally secured to the vehicle and a chain or cable is secured to a sprocket on a shaft secured to the second deck segment for moving the second deck segment relative to the first deck segment.

10 Claims, 5 Drawing Figures

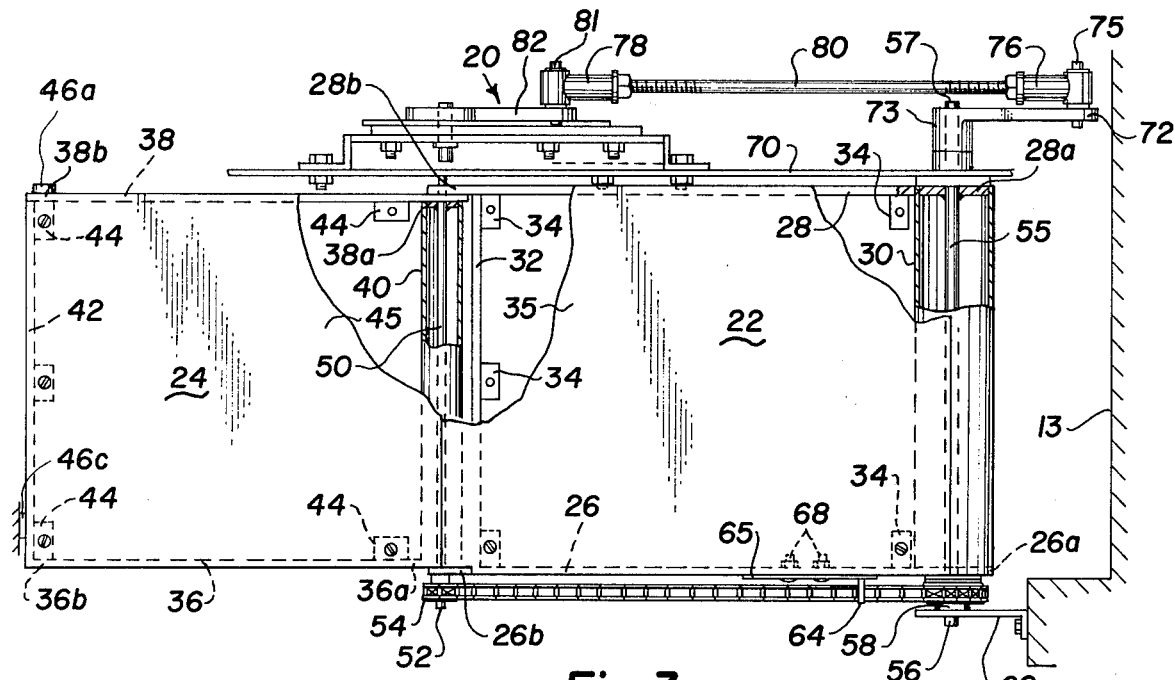
Fig. 3
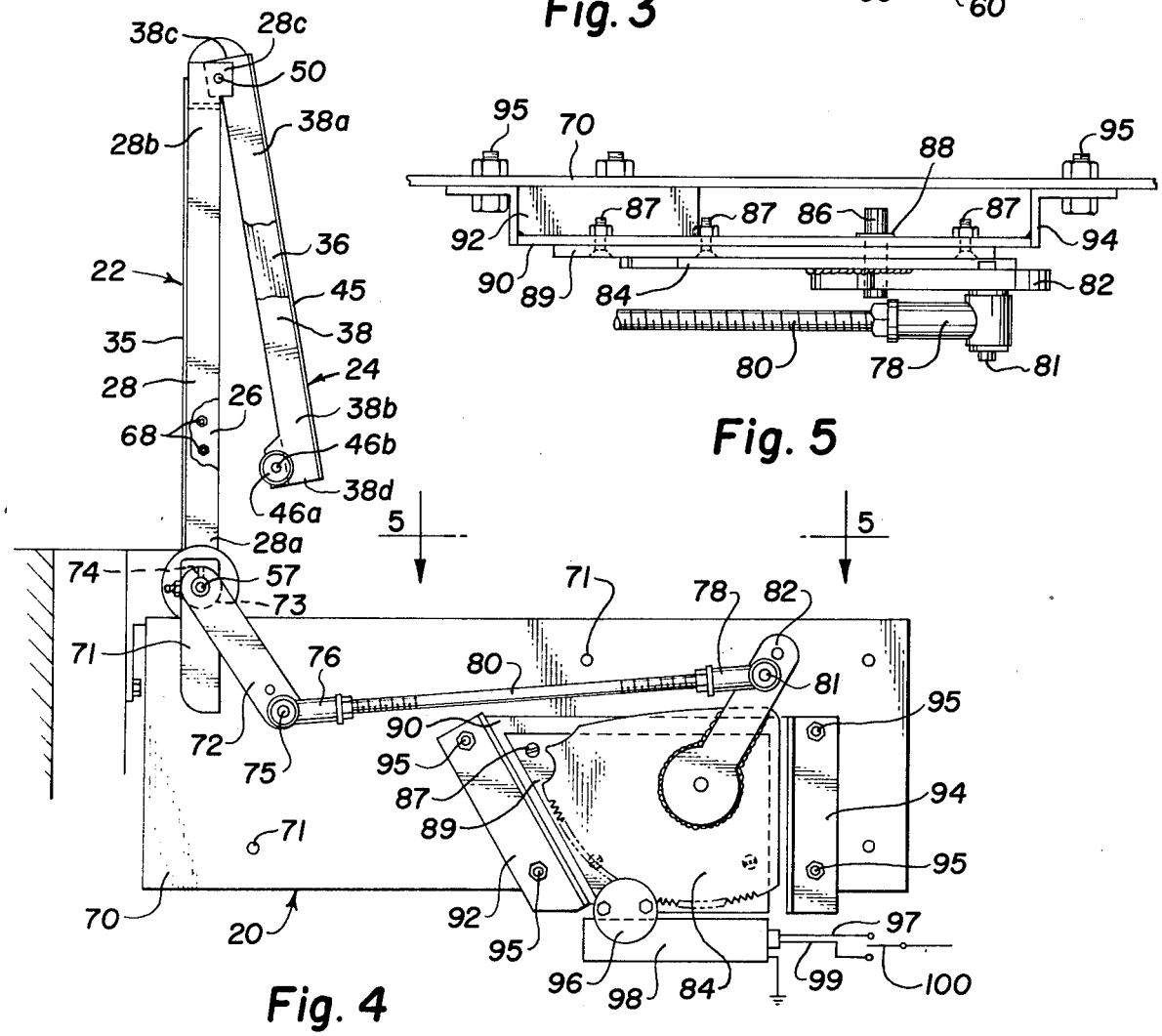
Fig. 5
Fig. 4

MOTORIZED BI-FOLD STEPWELL COVER

BACKGROUND OF THE INVENTION

A bus generally has a stepwell adjacent the door to permit rapid loading and unloading of passengers.

Heretofore, various folding and moveable step constructions have been devised to facilitate loading and unloading of passengers from platforms of different elevations onto or off of busses and other vehicles. The general state of the art is believed to be exemplified by the following U.S. Pat. Nos. 3,572,754; 3,408,959; 3,468,580; 3,608,957; 3,651,767; 3,672,311; 3,913,497 and 3,955,827.

When converting a bus or similar vehicle from a mass transit vehicle to a recreational vehicle, the type and position of seat employed is significantly different from that employed in a mass transit vehicle. Stepwell construction of the type heretofore devised is not particularly suited for use in recreational-type vehicles unless installed at the factory as original equipment on the vehicle.

Heretofore covers devised for covering a stepwell on a vehicle having stationary steps have generally comprised a rigid deck construction hingedly secured to the vehicle to permit movement of the rigid deck from a horizontal position covering the stepwell to a vertical position adjacent the front of the vehicle. Because of the space limitations required for movement of such a stepwell cover, such devices have not achieved significant commercial success.

SUMMARY OF INVENTION

The stepwell cover hereinafter described comprises a deck consisting of first and second deck segments, the deck segments being hingedly secured together adjacent a central portion of the deck. One of the deck segments is pivotally secured to the vehicle adjacent an upper end of the stepwell by a motor driven shaft adapted to rotate the first deck segment through an angle of ninety degrees from a horizontal position to a vertical position. The second deck segment is secured by a shaft having a sprocket mounted thereon to an edge of the first deck segment. A chain extends around the periphery of the sprocket secured to the shaft which is secured to the second deck segment. The other end of the chain extends around a portion of the periphery of a second sprocket which is rigidly secured to the vehicle and which has a radius which is two times the radius of the sprocket secured to the second deck segment. Thus, as the first deck segment rotates through an angle of ninety degrees the second deck segment is rotated through an angle of one hundred eighty degrees relative to the first deck segment to form a readily retractible stepwell cover which occupies minimum space when being moved between horizontal and vertical positions.

The actuating mechanism is particularly adapted for installation on a vehicle after the vehicle has been constructed for conversion of the vehicle to a recreational type vehicle.

A primary object of the invention is to provide a stepwell cover which can be mounted in a conventional vehicle to facilitate conversion of the vehicle from a mass transit type vehicle to a recreational type vehicle.

Another object of the invention is to provide a stepwell cover of strong durable construction which does not require extensive modification of the vehicle for installation of the stepwell cover.

Another object of the invention is to provide a stepwell cover of simple compact construction which requires minimum space for actuation of the stepwell cover between positions covering and uncovering the stepwell.

A further object of the invention is to provide a stepwell cover having a edge which moves in a substantially horizontal direction adjacent the floor of the vehicle when moving from a retracted to an extended position.

Other and further objects of the invention will become apparent upon referring to the detailed description hereinafter following and to the drawings annexed hereto.

DESCRIPTION OF DRAWING

Drawings of a preferred embodiment of the invention are annexed hereto so that the invention may be better and more fully understood, in which:

FIG. 3 is a top plan view of the stepwell cover illustrated in FIG. 1, the stepwell cover being illustrated in an extended position;

FIG. 4 is an elevational view of the inboard side of the stepwell cover, the steps and stepwell of the vehicle being broken away to more clearly illustrate details of construction; and FIG. 5 is an enlarged fragmentary top plan view of the actuating mechanism looking in the direction of the arrows along line 5—5 in FIG. 4 of the drawing.

Numeral references are employed to designate like parts throughout the various figures of the drawing.

DESCRIPTION OF A PREFERRED EMBODIMENT

Figure 1:
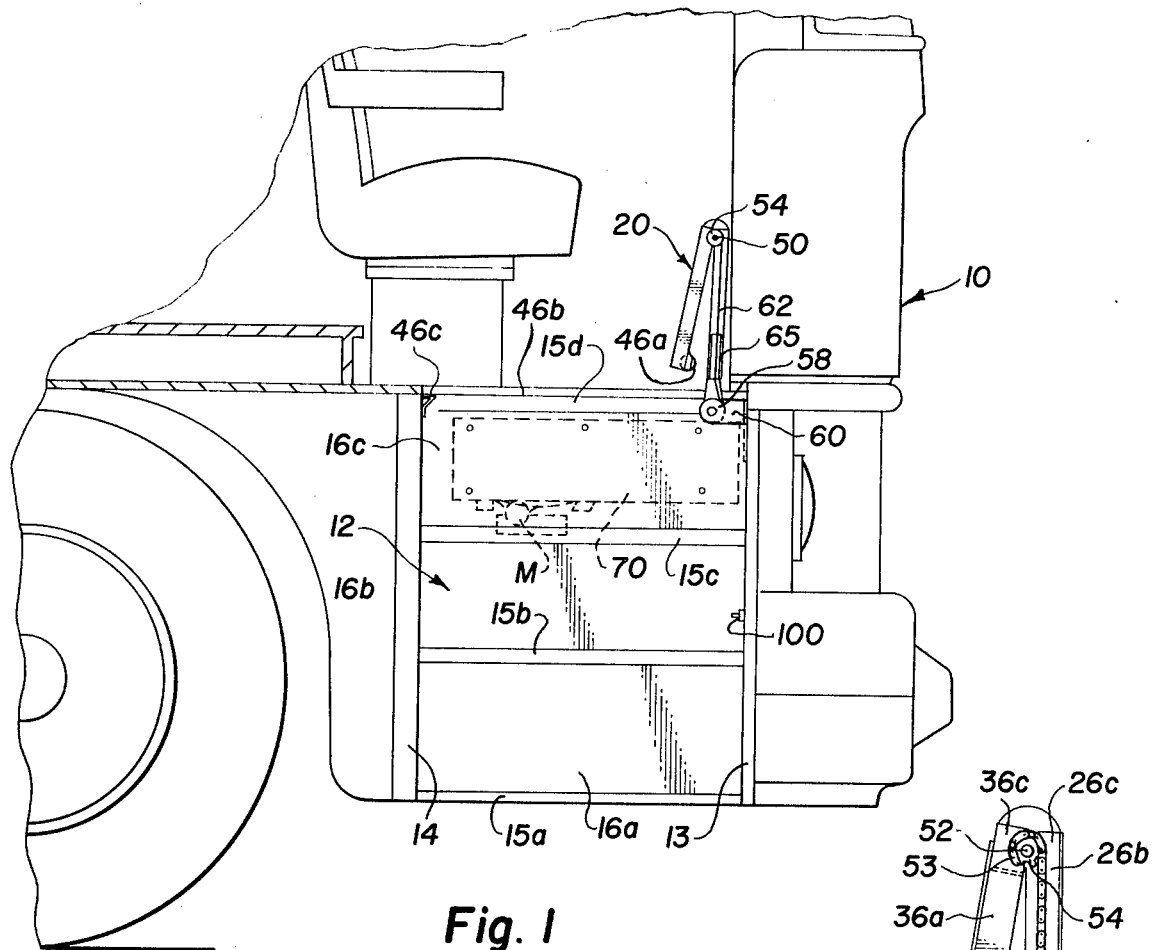
FIG. 1 is a fragmentary elevational view of the stepwell of a vehicle, the stepwell cover being illustrated in a retracted position.

Referring to FIG. 1 of the drawing the numeral 10 generally designates a bus or similar vehicle having a stepwell 12 comprising a front stepwell wall 13, a rear stepwell wall 14, steps 15a-d and risers 16a, 16b, and 16c. The door and a portion of the side of the bus are not illustrated.

Figure 2:
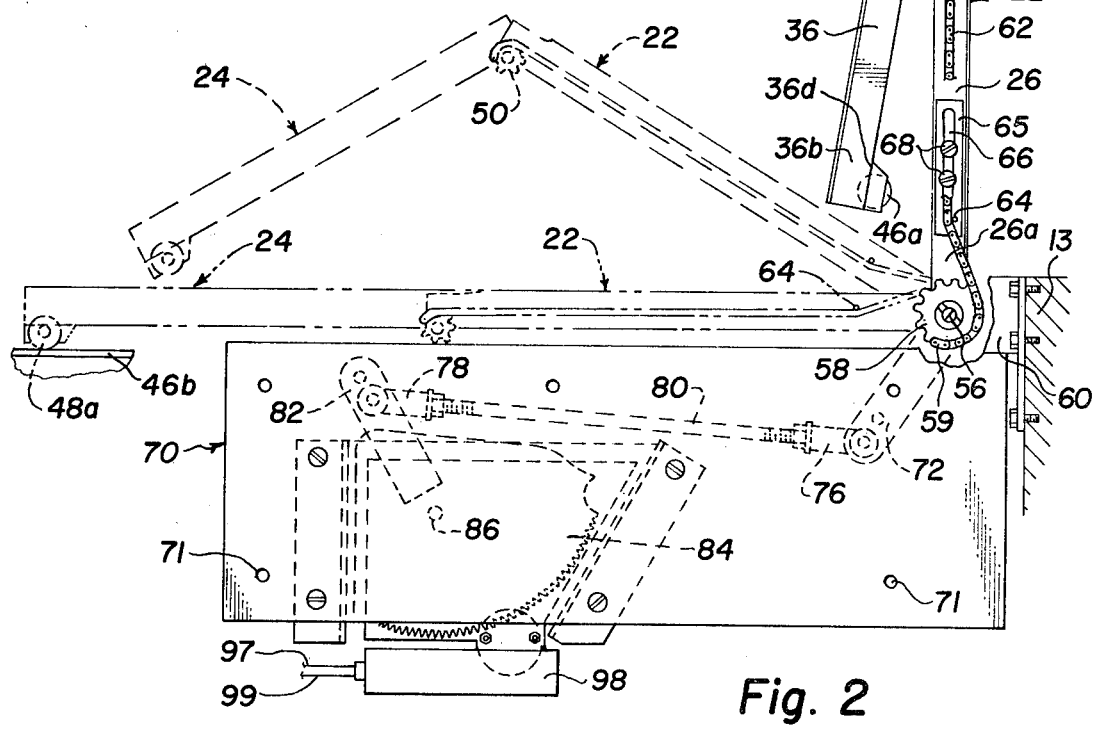
FIG. 2 is an enlarged elevational view of the stepwell cover illustrated in FIG. 1 of the drawing, the steps and stepwell of the vehicle being broken away to more clearly illustrate details of the construction.

The outboard side of a stepwell cover generally designated by the numeral 20 is illustrated in FIGS. 1 and 2 of the drawing. An elevational view of the inboard side of the stepwell cover 20 is illustrated in FIG. 4 of the drawing.

As best illustrated in FIGS. 2 and 3, stepwell cover 20 comprises a first or inboard deck segment 22 and a second or outboard deck segment 24, the deck segments 22 and 24 being moveable as illustrated in FIG. 2 of the drawing from a retracted position illustrated in full outline to an extended or horizontal position illustrated in dashed outline.

As best illustrated in FIGS. 2, 3 and 4 of the drawing, the first deck segment 22 comprises horizontally spaced beam members 26 and 28, a hollow cylindrical tube 30 being welded or otherwise secured between ends 26a and 28a and a brace member 32 being welded or otherwise secured adjacent ends 26b and 28b of beam members 26 and 28. As best illustrated in FIGS. 2 and 4 of the drawing, the inboard end 26b of beam member 26 has a lug 26c formed thereon and the inboard end 28b of beam member 28 has a lug 28c formed on the end thereof.

As best illustrated in FIG. 4 of the drawing, lower surfaces of the beam members 26 and 28 lie in a common lane, the plane extending through the center line of apertures formed in lugs 26c and 28c. Brace member 32 is spaced inwardly from the apertures formed in lugs 26c and 28c.

Cleats 34 are secured to beam members 26 and 28 and to brace member 32 to faciliate attaching a deck board 35 thereto to form a flat upper surface on the first or inboard deck segment 22.

The outboard or second deck segment 24 comprises horizontally spaced beam members 36 and 38, a hollow tube 40 having opposite ends welded or otherwise rigidly secured between ends 36a and 38a of beam members 36 and 38 and having a brace member 42 secured between ends 36b and 38b of beam members 36 and 38.

As best illustrated in FIG. 4, lower surfaces of beam members 36 and 38 lie in a common plane, the plane extending through the center line of apertures formed in lugs 36c and 38c formed on ends 36a and 38a of beam members 36 and 38, respectively, and through apertures formed in lugs 36d and 38d formed on ends 36b and 38b of beam members 36 and 38, respectively.

Cleats 44 are secured to beam members 36 and 38 and to brace member 42 to facilitate attaching a board or other suitable deck surface 45 to the second or outboard deck segment 24.

Axle 46a extends through an aperture in lug 38d on the outboard end of beam member 38 of the second deck segment 24. Roller 48a is rotatably secured to axle 46a and rolls along track 46b for supporting the inboard side of the outboard end of deck segment 24 when the stepwell cover is in the extended position. A lug 46c is secured to the rear stepwell wall 14 to support the outboard side of the outboard end of the deck segment 24 when the stepwell cover is in the extended position.

A shaft 50 extends through axially aligned apertures formed in lugs 26c, 28c, 36c, and 38c for pivotally securing the outboard deck segment 24 to the outer edge of the inboard deck segment 22. As best illustrated in FIG. 3, shaft 50 extends through hollow tube 40 and is welded or otherwise rigidly secured to beam members 36 and 38 of the outboard deck segment 24 such that rotation of shaft 50 imparts rotation to the outboard deck segment 24 relative to inboard deck segment 22.

As best illustrated in FIG. 3 of the drawing, a shaft 55 extends through hollow tubular member 30 and opposite ends of shaft 55 extend through ends of beam members 26 and 28, shaft 55 being welded or otherwise non-rotatably secured to beam members 26 and 28. The outboard end of 56 of shaft 55 extends through a central opening formed in the hub of a sprocket 58, the hub of the sprocket 58 being welded or otherwise rigidly secured to a support bracket 60 secured by bolts or other suitable fasteners to the front stepwell wall 13.

The outboard end 52 of shaft 50, which extends through hollow tubular member 40, has a sprocket 54 welded or otherwise non-rotatably secured thereto, sprocket 54 preferrably having a radius which is equal to one-half of the radius of sprocket 58 secured to support member 60.

As best illustrated in FIG. 2 of the drawing, chain 62 extends about portions of the periphery of each of the sprockets 54 and 58, chain end 53 being welded or otherwise secured to sprocket 54 and chain end 59 being welded or otherwise rigidly secured to sprocket 58.

As will be hereinafter more fully explained, an idler pin 64 is secured to a plate 65 having an adjusting slot 66 formed therein through which bolts 68 extend for securing plate 65 to beam member 26 on the first deck segment 22. Idler pin 64 engages a central portion of chain 62 for adjusting the angular relationship of the second deck segment 24 relative to the first deck segment 22.

As best illustrated in FIGS. 3, 4 and 5 of the drawing, the inboard end 57 of shaft 55 is rotatably journalled in an aperture formed in an upward extending lub 73 secured to support plate 70. Support plate 70 is secured to the top step riser 16c by bolts or other suitable connectors extending through aperture 71 to the top stepwell riser 16c in the stepwell 12 of the vehicle.

As best illustrated in FIGS. 3 and 4, a control arm 72 extends outwardly from hub 73 which is non-rotatably secured to the inboard end 57 of shaft 55 by a key or set screw 74. A pin 75 is secured to the outer end of control arm 72 and is rotatably journalled in the end of a clevis 76 threadedly secured to threaded control rod 80. A second clevis 78 is threadedly secured to the opposite end of control rod 80 and is pivotally secured to a pin 81 secured to the end of control lever 82.

Control lever 82 is rigidly secured, as by welding, to gear segment 84. As best illustrated in FIGS. 4 and 5, gear segment 84 has a shaft 86 welded or otherwise rigidly secured thereto which extends through an aperture in bearing plate 89 and through an aperture in mounting plate 90. Shaft 86 is restrained against longitudinal movement by a stop collar 88.

Edges of mounting plate 90 are welded or otherwise secured to front mounting bracket 92 and rear mounting bracket 94 which are secured by bolts 95 to support plate 70.

Bearing plate 89 is secured to mounting plate 90 by bolts 87 having heads countersunk into bearing plate 89.

Gear segment 84 has gear teeth on the outer periphery thereof disposed in meshing relationship with a gear 96 driven by an electric motor 98. Electric motor 98 is connected by conductors 97 and 99 to an electrical power supply on the vehicle. Conductor 99 is equipped with a control switch 100 for energizing and de-energizing electric motor 98.

OPERATION

The operation and function of the apparatus heretofore described is as follows:

When the stepwell cover 20 is in the retracted position illustrated in FIGS. 1, 2 and 4 of the drawing, switch 100 is actuated to energize motor 98 for imparting motion through gear segment 84, control lever 82, control rod 80, control arm 72 and shaft 55 for rotating the first or inboard deck segment 22 through an angle of approximately ninety degrees from a substantially vertically disposed attitude to a horizontally disposed attitude.

As the first deck segment 22 rotates, shaft 50, which is rigidly secured to the second deck segment 24, moves along an arcuate path. Since the end 59 of chain 62 is secured to stationary sprocket 58, sprocket 58 having a radius which is equal to two times the radius of sprocket 53, shaft 50 while moving along an arcuate path will be rotated approximately one hundred eighty degrees about the axis of shaft 50.

As illustrated in FIG. 2 of the drawing, the outboard end of the second deck segment 24 moves along a slightly curved but almost horizontal path as the stepwell cover moves from a retracted position to an extended position.

If the upper surfaces 35 and 45 of deck segments 22 and 24 do not lie in a common flat plane, bolts 68 should be loosened to permit movement of slotted plate 65 and idler pin 64 longitudinally relative to beam member 26 for imparting slight rotation of sprocket 54 relative to sprocket 58 to move surfaces 35 and 45 into a common plane.

For retracting the stepwell cover, motor 98 is reversed for pivoting the inboard deck segment 22 through an angle of approximately ninety degrees, thereby imparting rotation of outboard deck segment 24 through an angle of approximately one hundred eighty degrees relative to deck segment 22.

In view of the foregoing, it should be readily apparent that the motorized bi-fold stepwell cover hereinbefore described accomplishes the objects of the invention hereinbefore enumerated.

The stepwell cover does not require extensive modification of the vehicle for installation. It is only necessary to drill a hole through riser 16c through which the end of shaft 50 will extend to facilitate attaching support plate 70 to the top step riser 16c under the vehicle. Support plate 60 is secured by screws or other suitable fasteners to the front wall of the stepwell to complete the installation. Conductors 97 and 99 are then connected to a suitable normally open spring centered double throw switch which may be mounted at any location, for example, on the dash of the vehicle.

It should be appreciated that sprockets 54 and 58 may be replaced by a pair of pulleys or other curved surfaces and that chain 62 could be replaced by a cable, rope or other suitable tension carrying member without departing from the concept of the invention.

A carpet is preferrably attached to upper surfaces of deck segments 22 and 24. The provision of tubular members 30 and 40 adjacent inboard ends of deck segments 22 and 24 assures that spacing between edges of deck segments 22 and 24 and between the edge of deck segment 22 and front wall 13 of the stepwell will not change significantly as the stepwell cover is moved from a retracted to an extended position. This construction provides a dual function. First, the likelihood that an occupant of the vehicle will be injured by being pinched in a crack the width of which varies as the segments move relative to each other is minimized. Further, the curved surfaces over which the carpet extends provides a pleasing appearance free of sharp corners which might injure passengers or damage luggage or other equipment moved through the stepwell of the vehicle.

It should be appreciated that more than one switch 100 may be positioned at various locations, for example in the stepwell 12 adjacent the door of the vehicle, to permit actuation of the stepwell cover 20 from outside the vehicle.

Having described my invention, I claim:

1. In a vehicle having steps in a stepwell, a stepwell cover comprising: inboard and outboard deck segments; means pivotally securing the inboard deck segment adjacent an upper end of a side of the stepwell, said inboard deck segment being moveable between a substantially vertically disposed first inboard deck segment position and a substantially horizontally disposed second inboard deck segment position; means pivotally securing said outboard deck segment to the inboard deck segment, said outboard deck segment being moveable between a substantially vertically disposed first outboard deck segment position and a substantially horizontally disposed second outboard deck segment position; a first curved surface; means securing said first curved surface relative to the vehicle; a second curved surface; means securing said second curved surface to said outboard deck segment, said first curved surface having a radius of curvature substantially equal to two times the radius of curvature of the second curved surface; and a flexible tension carrying member extending about said first and second curved surfaces such that movement of said inboard deck segment between said first and second inboard deck segment positions moves said outboard deck segment between said first and second outboard deck segment positions.

2. The stepwell cover of claim 1, said means pivotally securing said inboard deck segment adjacent an upper end of a side of said stepwell comprising: an inboard shaft rigidly secured to said inboard deck segment.

3. The stepwell cover of claim 2, with the addition of an electric motor secured to said vehicle; and control means drivingly secured between the motor and the inboard shaft for movement of said inboard segment.

4. In a vehicle having steps in a stepwell, a stepwell cover comprising an inboard deck segment; an outboard deck segment; a first shaft rigidly secured to said inboard deck segment; a first sprocket rotatably secured to said first shaft; means non-rotatably securing said first sprocket to said vehicle; a second shaft rigidly secured to said outboard deck segment; means rotatably securing said second shaft to said inboard deck segment; a second sprocket non-rotatably secured to said second shaft, a chain extending about said first and second sprockets, said first sprocket having a radius which is two times the radius of said second sprocket; and means to rotate said first shaft to rotate said inboard deck segment 90 degrees relative to said vehicle and to rotate said outboard deck segment through an angle of approximately 180 degrees relative to said inboard deck segment.

5. In a vehicle having steps in a stepwell, a stepwell cover comprising: inboard and outboard deck segments; means pivotally securing the inboard deck segment adjacent an upper end of a side of the stepwell, said inboard deck segment being moveable between a substantially vertically disposed first inboard deck segment position and a substantially horizontally disposed second inboard deck segment position; means pivotally securing said outboard deck segment to the inboard deck segment, said outboard deck segment being moveable between a substantially vertically disposed first outboard deck segment position and a substantially horizontally disposed second outboard deck segment position; and actuating means connected to said inboard deck segment and to said outboard deck segment, said actuating means being constructed and arranged to move said inboard deck segment between said first and second inboard deck segment positions while simultaneously moving said outboard deck segment between said first and second outboard deck segment positions; said actuating means comprising: a first curved surface; means securing said first curved surface to the vehicle; a second curved surface; means securing said second curved surface to said outboard deck segment, said first curved surface having a radius of curvature substantially equal to two times the radius of curvature of the second curved surface; and a flexible tension carrying member extending about said first and second curved surfaces.

6. The stepwell cover of claim 5, said actuating means further comprising: an idler pin; and means adjustably securing said idler pin to said inboard deck segment such that said idler pin engages said tension carrying member.

7. In a vehicle having steps in a stepwell, a stepwell cover comprising: inboard and outboard deck segments; an inboard shaft rigidly secured to said inboard deck segment, said inboard shaft pivotally securing the inboard deck segment adjacent an upper end of a side of the stepwell, said inboard deck segment being moveable between a substantially vertically disposed first inboard deck segment position and a substantially horizontally disposed second inboard deck segment position; an outboard shaft non-rotatably secured to the outboard deck segment and rotatably secured to the inboard deck segment, said outboard shaft pivotally securing said outboard deck segment to the inboard deck segment, said outboard deck segment being moveable between a substantially vertically disposed first outboard deck segment position and a substantially horizontally disposed second outboard deck segment position; an electric motor secured to the vehicle; and control means secured between the motor and the inboard shaft to move said inboard deck segment between said first and second inboard deck segment positions while simultaneously moving said outboard deck segment between said first and second outboard deck segment positions.

8. The stepwell cover of claim 7, said actuating means comprising: a first curved surface; means securing said first curved surface to the vehicle; a second curved surface; means securing said second curved surface to said outboard shaft, said first curved surface having a radius of curvature substantially equal to two times the radius of curvature of the second curved surface; and a flexible tension carrying member extending about said first and second curved surfaces; means securing one end of said tension carrying member to said first curved surface; and means securing a second end of said tension carrying member to said second curved surface.

9. The stepwell cover of claim 8, said first and second curved surfaces comprising first and second sprockets, said first sprocket being non-rotatably secured to the vehicle and the second sprocket being non-rotatably secured to said outboard shaft, and said tension carrying member comprising a chain.

10. In a vehicle having steps in a stepwell, a stepwell cover comprising: an electric motor secured to said vehicle; inboard and outboard deck segments; an inboard shaft rigidly secured to said inboard deck segment, said inboard shaft pivotally securing the inboard deck segment adjacent an upper end of a side of the stepwell, said inboard deck segment being moveable between a substantially vertically disposed first inboard deck segment position and a substantially horizontally disposed second inboard deck segment position; a gear segment disposed in driving relation with said electric motor; a control lever secured to said gear segment; a control arm secured to said inboard shaft; means pivotally securing said outboard deck segment to the inboard deck segment, said outboard deck segment being moveable between a substantially vertically disposed first outboard deck segment position and a substantially horizontally disposed second outboard deck segment position; and a control rod secured to said control lever and to said control arm to move said inboard deck segment between said first and second inboard deck segment between said first and second inboard deck segment positions while simultaneously moving said outboard deck segment between said first and second outboard deck segment positions.

* * * * *